United States Patent Office 3,069,183
Patented Dec. 18, 1962

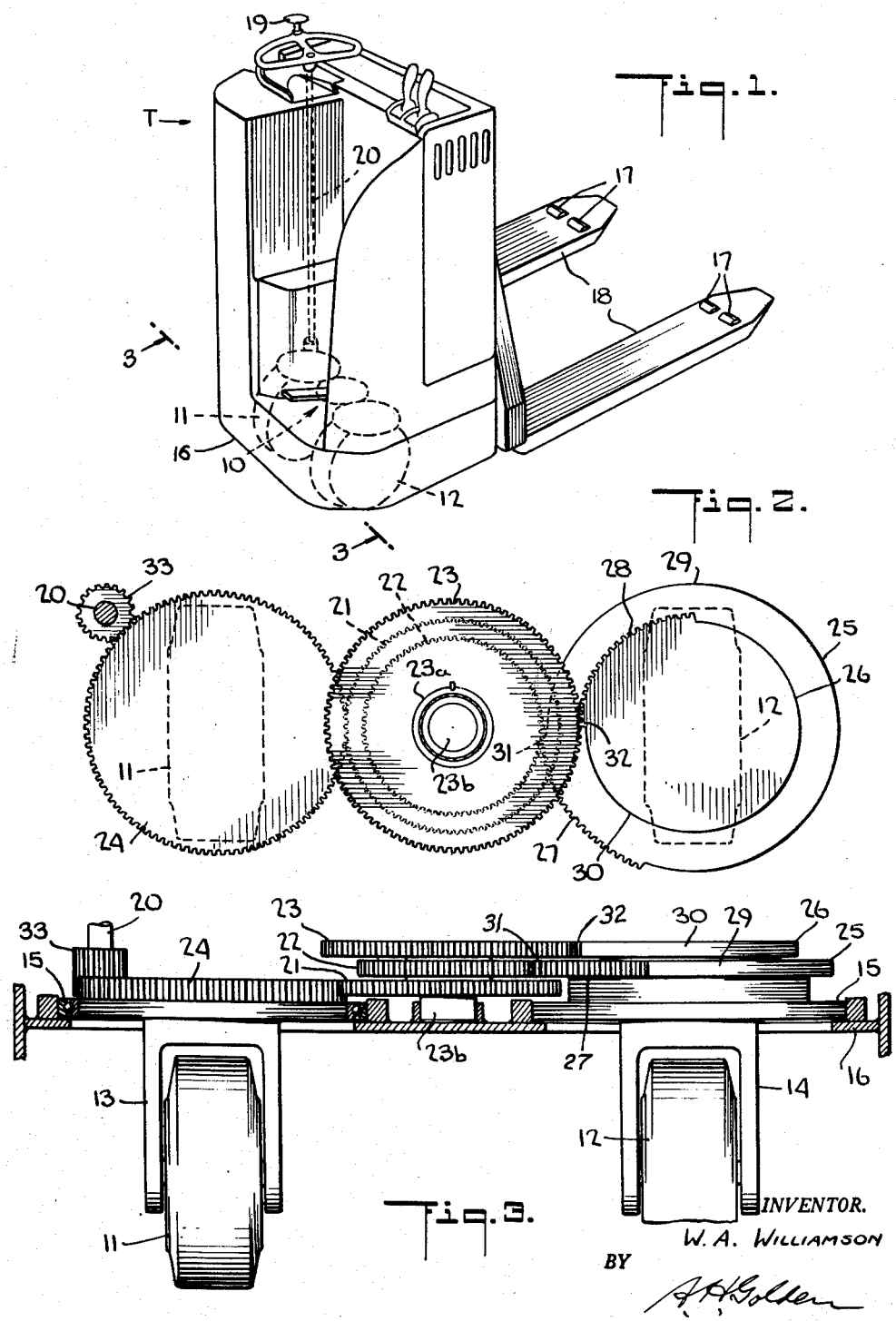

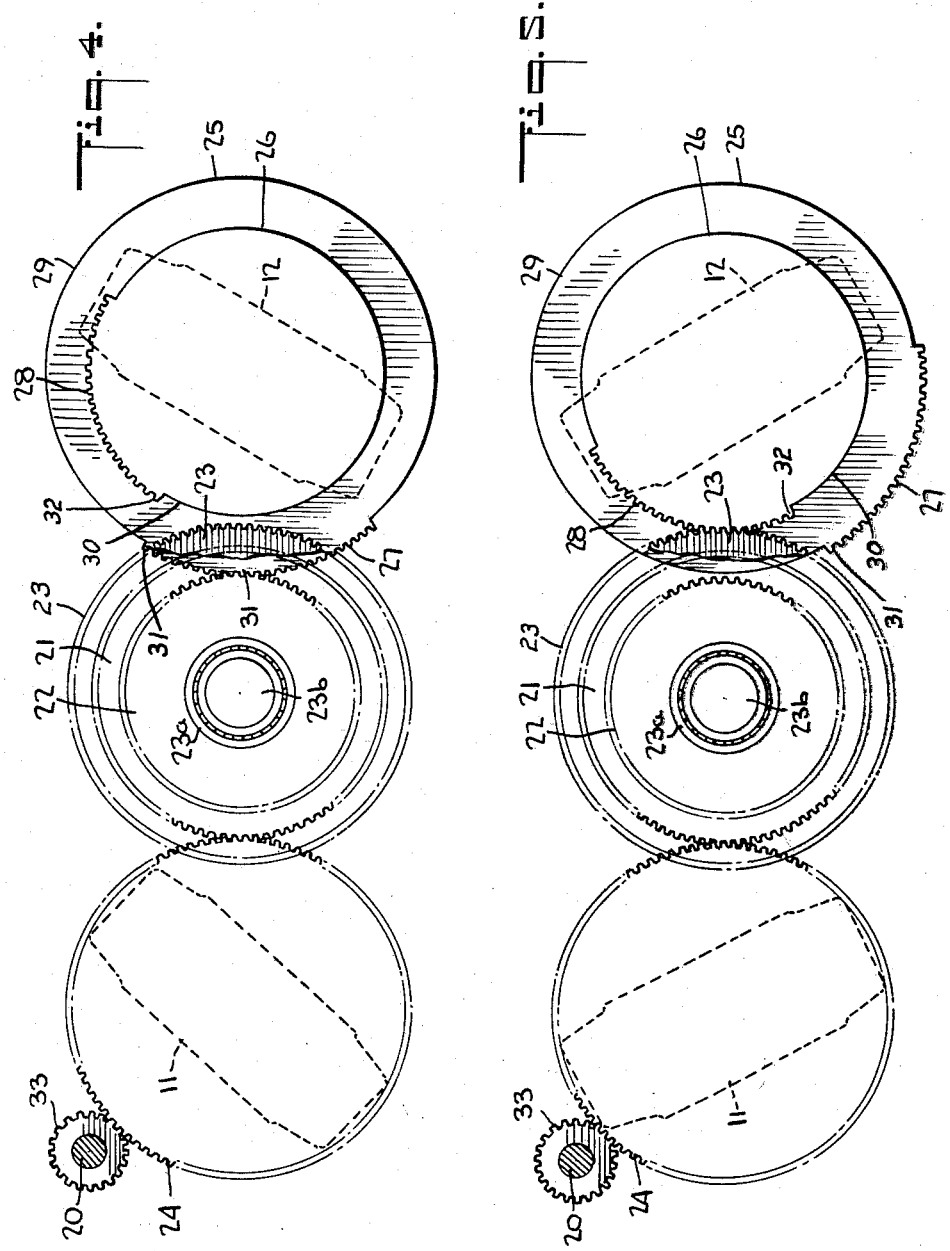

3,069,183
INDUSTRIAL TRUCK STEERING MECHANISM
William A. Williamson, Battle Creek, Mich., assignor to The Yale and Towne Manufacturing Company, Stamford, Conn., a corporation of Connecticut
Filed Dec. 29, 1959, Ser. No. 862,699
1 Claim. (Cl. 280—93)

This invention relates to novel mechanism utilizing gears to effect the geometric steering of an industrial truck.

The prior art contains many examples of mechanism that will steer two wheels geometrically, so that the wheels when steered can move without side slip over the ground. As will be appreciated, the steering wheel that moves on the shorter radius will be steered through the greater angle, enabling the axes of all of the truck wheels to intersect at substantially the same point.

Some industrial trucks of the prior art are equipped with a member, such as a gear, that has an eccentric movement in order to effect steering through the proper geometric angles. By using such an eccentric movement, it has been possible in some cases to design the steering mechanism so as to meet the rather severe space limitation that may be present in an industrial truck, and also to steer the truck wheels through the wide angle that is required.

Of course, it is necessary in the steering mechanisms of that kind to use a member that is formed in an eccentric shape, or to use with the member some means that will contribute the eccentric movement. Through the exceedingly novel concept of my invention, I am able to construct a geometric steering mechanism that will completely eliminate the need for eccentric movements or parts, while meeting very well the steering requirements of an industrial truck.

In my invention, I utilize first and second sets of gears to control the differential steering movements between the two wheels, with those sets of gears alternately effective as the wheels are steered through different zones of their steering rotation. Since only one set of gears will be in control when the wheels are steered in a particular zone, each gear set need merely have a simple gear ratio and each gear can be a circular gear that rotates in a fixed axis.

More in detail, I utilize a set of gears having a ratio that is adapted to steer one wheel more rapidly than the other, and a second gear set adapted to steer the one wheel more slowly than the other wheel. Each set of gears has portions that may comprise gear teeth, and that are engaged to hold the wheels in aligned relation to one another when they are in their neutral or straight ahead position. Further, the gear teeth on one gear of each set extend around a portion of its periphery, leaving a free portion on the gear, so that one set of gears will be in meshing relation while the other set will be unmeshed as the wheels are steered in each direction from neutral position. The gears then can steer each wheel through the proper angles to effect geometric steering of the truck.

The gears in my construction will be effective while the wheels are steered through a very wide angle. Also, the gears can be arranged in substantially aligned relation in a transverse direction whereby to take up little space on the truck. Those things together with the fact that I do not need eccentric movements to effect the geometric steering, enable me to utilize my invention to very considerable advantage on an industrial truck.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claim appended hereto. Those skilled in the art will appreciate that the conception on which my disclosure is based may readily be utilized as a basis for the designing of other structures for carrying out the several purposes of my invention. It is important, therefore, that the claim be regarded as including such equivalent constructions as do not depart from the spirit and scope of my invention, in order to prevent the appropriation of my invention by those skilled in the art.

Referring now to the drawings:

FIG. 1 shows an industrial truck that utilizes my novel geometric steering mechanism.

FIG. 2 shows a plan view of my invention.

FIG. 3 shows a view of my mechanism taken on the line 3—3 in FIG. 1.

FIGS. 4 and 5 are similar to FIG. 2, but partly in phantom and showing positions of my mechanism when the truck wheels are steered in different directions.

My invention may more easily be understood if I refer first to FIG. 1, in which I show an industrial truck T that is equipped with my novel steering mechanism 10, as indicated generally in dotted lines, to control the steering of two truck wheels 11 and 12. The wheels 11 and 12 are supported for individual steering rotation on one end of the truck T, as through a pair of wheel mountings 13 and 14, shown in FIG. 3, that rotate on bearings 15 relatively to the truck frame 16. The opposed end of truck T, FIG. 1, will move on wheels 17 that are mounted on load members 18 extending from the truck frame 16, as is conventional.

The truck T that I have chosen to illustrate has a steering handle 19 that is used to actuate a part of my novel mechanism 10, as for example through a shaft 20, whereby to steer both wheels 11 and 12. Further details of the truck T are not important to an understanding of my invention, and it is merely necessary to know that the wheels 11 and 12 are individually mounted to rotate for steering one end of the truck.

In the construction that I prefer to use for my novel steering mechanism 10, I utilize between the truck wheels 11 and 12 a series of circular gears 21, 22, 23, well shown in FIGS. 2 and 3, that are secured to rotate as an integral unit. The rotation of that gear unit will take place about a fixed axis on the truck, as on bearings 23a supported on a shaft 23b on the truck frame 16. The gear 21 is in meshing relation to a gear 24, that gear 24 being secured to the wheel mounting 13 to rotate integrally therewith. Thus, it will be appreciated that the gears 21, 22 and 23 will rotate together, incidental to the steering rotation of the truck wheel 11.

I further utilize two gears 25, 26 that are secured to rotate integrally with the mounting 14 of the opposed truck wheel 12, those gears 25, 26 meshing one with each of the gears 22 and 23. At this point I shall call attention to the fact that the gears 23 and 26 are so proportioned as to act with a particular gear ratio, while the gears 22 and 25 will act with a second ratio. Further, the gear 22 has a smaller effective diameter than does gear 21 on the mounting of wheel 11, while the gear 23 has a diameter larger than gear 21.

It will be seen that we now have two sets of gears with inverse ratios extending between the truck wheels 11 and 12. One of those sets comprises the pair of gears 23 and 26, together with gears 21 and 24, and is adapted to steer the wheel 12 more rapidly than the wheel 11 is steered, and the other set comprises the pair of gears 22 and 25 together with gears 21 and 24, and is adapted to steer the wheel 12 slower than the wheel 11. I shall fully explain the operation of the two sets of gears, but it will first be necessary to describe the gears in further detail.

Let us refer to FIG. 2, which shows the position of the gears when the wheels 11 and 12 are in a neutral or straight ahead steering position. I form one gear of each set, those gears being the gears 25 and 26 in the construction that I illustrate, with gear teeth 27 and 28 that extend around a portion of each gear periphery, leaving a free portion 29, 30 on each gear 25 and 26. The arrangement is such that a part 31, 32 of each toothed portion 27 and 28 will coact with the corresponding meshing gear 22 or 23 when the wheels 11 and 12 are in neutral steering position, as in FIG. 2. Also, the toothed portions 27, 28 extend in opposed directions on the peripheries of their gears 25 and 26, so that one or the other of those gears may unmesh.

Thus, should the wheels 11 and 12 be steered in one direction, as shown for example in FIG. 4, the toothed portion 27 on gear 25 will continue to mesh, while the free portion 30 on gear 26 will unmesh that gear. That naturally will place in effect the gear ratio between gears 22 and 25 so that wheel 11 will be steered more rapidly than is wheel 12. Should the wheels 11 and 12 be steered in the other direction from their neutral position, as shown in FIG. 5, the toothed portion 27 will unmesh while the portion 28 continues to mesh, so that wheel 12 will be steered more rapidly than is wheel 11.

I thereby have what is in effect two sets of gears that will operate alternately to control differential steering movements of the truck wheels 11, 12 when steered at opposed sides of their neutral steering position. All of the gears can be circular in form, and need have no eccentric movements, yet the gears can operate in a very satisfactory manner to effect geometric steering of the truck wheels 11, 12.

Of course, the actual steering power can be applied through substantially any part of my novel mechanism. For the purposes of disclosure, I show a gear 33 through which the steering shaft 20 will rotate the gear 24, whereby to steer both wheels 11, 12.

I believe that those persons skilled in the art will now understand the operation and advantages of my novel steering mechanism. In my inventive concept, I utilize two sets of members that will act at two different rates to effect differential steering movements, with means whereby those sets will be alternately placed in control of the steering. I then do not need eccentric movements to effect the geometric steering of an industrial truck, and I actually can use gears of circular form and rotating in a fixed axis. Those gears may act efficiently when the truck wheels are steered through a very wide angle, and will require little space on the truck. Therefore, I believe that the considerable merits of my invention will be fully appreciated.

I now claim:

In a truck of the class described,
a pair of steering wheels individually mounted for steering rotation,
a steering control assembly extending between said steering wheels including first and second pairs of gears,
means mounting one gear of each pair to rotate integrally with one steering wheel,
said control assembly including a further gear mounted to rotate integrally with the other gears of both pairs,
a gear mounted to rotate integrally with the other steering wheel and meshing with said further gear so that the said other wheel rotates at a particular angular rate in respect to the rotation of said other gears of both pairs,
said first pair of gears having a gear ratio that will act at a predetermined rate to effect differential steering between the wheels,
the second pair of gears having a gear ratio that will act at a second predetermined rate to effect differential steering rotation,
and toothed and free portions so arranged on one gear of each pair of gears that teeth on merely one of said pairs of gears will mesh as the wheels are steered in each direction from a neutral steering position, whereby to effect geometric steering of the wheels through the two pairs of gears.

References Cited in the file of this patent

UNITED STATES PATENTS

| | | |
|---|---|---|
| 1,432,494 | Regen | Oct. 17, 1922 |
| 2,731,277 | Pearne | Jan. 17, 1956 |
| 2,848,247 | Schreck | Aug. 19, 1958 |
| 2,915,319 | Kumler et al. | Dec. 1, 1959 |

FOREIGN PATENTS

| | | |
|---|---|---|
| 6,236 | Great Britain | of 1906 |